US007005006B2

(12) United States Patent
Suzuki et al.

(10) Patent No.: US 7,005,006 B2

(45) Date of Patent: Feb. 28, 2006

(54) COATING LIQUID FOR AN INTERMEDIATE LAYER OF ELECTROPHOTOGRAPHIC PHOTOCONDUCTOR, MANUFACTURING METHOD THEREOF, ELECTROPHOTOGRAPHIC PHOTOCONDUCTOR, ELECTROPHOTOGRAPHIC APPARATUS, AND ELECTROPHOTOGRAPHIC PHOTOCONDUCTOR PROCESS CARTRIDGE USING SAME

(75) Inventors: Yasuo Suzuki, Shizuoka (JP); Akihiro Sugino, Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/827,253

(22) Filed: Apr. 20, 2004

(65) Prior Publication Data

US 2004/0197687 A1 Oct. 7, 2004

Related U.S. Application Data

(62) Division of application No. 10/090,745, filed on Mar. 6, 2002, now Pat. No. 6,777,150.

(30) Foreign Application Priority Data

| | | | |
|---|---|---|---|
| Mar. 6, 2001 | (JP) | ............................ | 2001-062194 |
| Feb. 5, 2002 | (JP) | ............................ | 2002-027561 |
| Feb. 26, 2002 | (JP) | ............................ | 2002-049149 |

(51) Int. Cl.
*C08J 3/02* (2006.01)
*G03G 15/04* (2006.01)

(52) U.S. Cl. ........................ 106/236; 430/60; 524/497

(58) Field of Classification Search ................ 106/236; 430/60; 524/497

See application file for complete search history.

(56) References Cited

U.S. PATENT DOCUMENTS

| | | | | |
|---|---|---|---|---|
| 4,484,949 | A * | 11/1984 | Potter et al. | 106/798 |
| 5,525,440 | A * | 6/1996 | Kay et al. | 429/111 |
| 5,561,022 | A * | 10/1996 | Nogami et al. | 430/131 |
| 6,143,453 | A | 11/2000 | Sugimura et al. | |

FOREIGN PATENT DOCUMENTS

| | | |
|---|---|---|
| JP | 10/83093 | 3/1989 |
| JP | 5-204181 | 8/1993 |
| JP | 8-44096 | 2/1996 |
| JP | 9-34152 | 2/1997 |
| JP | 9-292730 | 11/1997 |
| JP | 10-90931 | 4/1998 |
| JP | 10-301314 | 11/1998 |
| JP | 11-15181 | 1/1999 |
| JP | 2000-66432 | 3/2000 |

* cited by examiner

*Primary Examiner*—Mark A. Chapman
(74) *Attorney, Agent, or Firm*—Oblon, Spivak, McClelland, Maier & Neustadt, P.C.

(57) ABSTRACT

A coating liquid for an electrophotographic photoconductor intermediate layer comprising a titanium oxide and a polycarboxylic acid polymer in a solvent is provided. The content of the polycarboxylic acid polymer is 0.3 to 10 parts by weight in respect to 100 parts by weight of the titanium oxide, and an acid value of the polycarboxylic acid polymer is 30 to 400 mgKOH/g.

7 Claims, 3 Drawing Sheets

COATING LIQUID FOR AN INTERMEDIATE LAYER OF ELECTROPHOTOGRAPHIC PHOTOCONDUCTOR, MANUFACTURING METHOD THEREOF, ELECTROPHOTOGRAPHIC PHOTOCONDUCTOR, ELECTROPHOTOGRAPHIC APPARATUS, AND ELECTROPHOTOGRAPHIC PHOTOCONDUCTOR PROCESS CARTRIDGE USING SAME

This application is a Divisional application of Ser. No. 10/090,745, filed Mar. 6, 2002 now U.S. Pat. No. 6,777,150.

BACKGROUND OF THE INVENTION

1. Field of the Invention

This invention relates to a coating liquid for an intermediate layer of an electrophotographic photoconductor that excels in coating properties, and a manufacturing method thereof. The present invention also relates to an electrophotographic photoconductor for providing images of high picture quality with no image defects, produced using the coating liquid for the intermediate layer of the electrophotographic photoconductor, and to both an electrophotographic apparatus using the coating liquid and an electrophotographic apparatus process cartridge.

2. Description of the Related Art

Conventionally, various efforts have been made to develop electrophotographic photoconductors utilizing organic photoconductive materials exhibiting outstanding properties in terms of sensitivity, thermal stability, and toxicity and the like for such inorganic materials as Se, CdS, and ZnO, as photoconductive materials used in electrophotographic photoconductors, and electrophotographic photoconductors utilizing organic photoconductive materials are now employed in many copiers and printers.

In general, in an image forming apparatus such as a printer, copier, or facsimile machine, image formation is carried out by a series of steps, namely charging step, exposing step, developing step, and transferring step. Accordingly, an apparatus for implementing such image formation comprises at least a charging device, an image exposing device, a developing device (particularly a reverse developing device), a transferring device, and an electrophotographic photoconductor. However, with an image forming apparatus having such configuration, abnormal images tend generate during a long-term continuous use.

Moreover, in recent years, a shift to digitalization has rapidly grown, and semiconductor lasers which emit monochromatic light are used in these printers and copiers to cope with the digitalization, leads a demand for photoconductors suitable for exposure by semiconductor lasers. One of the problems with photoconductors when exposed by a semiconductor laser is that of abnormal images resulting from moire caused by light interference, or the occurrence of black specks or black spots or the like resulting from the injection of holes from the photoconductive substrate to the photoconductive layer or the electric charge generating layer during reverse developing. To deal with these problems, an intermediate layer formed on the surface of the electroconductive substrate of the photoconductor has an important role to play, measures such as addition of fine particles of a metal oxide or inorganic substance to the intermediate layer to prevent moire are taken.

Examples relating to the intermediate layer mentioned above include following examples.

(1) Japanese Patent Application Laid-Open No. H11-15181/1999

(published) (Minolta): An electrophotographic photoconductor comprising a photosensitive layer on a photoconductor substrate obtained by anodizing the surface of an aluminum or aluminum alloy substrate, performing mechanical polishing, hot water sealing, thereafter applying sealing process mentioned above, or humidifying.

(2) Japanese Patent Application Laid-Open No. 10-301314/1998 (published) (Minolta): In an electrophotographic photoconductor having at least an undercoat layer and photosensitive layer on an electroconductive substrate, the undercoat layer is comprised of a heat hardened composition wherein colloidal alumina has been mixed into a certain type of organoalcoxy siloxane.

(3) Japanese Patent Application Laid-Open No. H10-90931/1998 (published) (Minolta): In an electrophctographic photoconductor having at least an undercoat layer and photosensitive layer on an electroconductive substrate, the undercoat layer is comprised of heat-treated titanium oxide in the resin.

(4) Japanese Patent Application Laid-Open No. H5-204181/1993 (published) (Konica): An electrophotographic photoconductor having an electroconductive polyaniline layer and a photosensitive layer laminated on a substrate.

(5) Japanese Patent Application Laid-Open No. H8-44096/1996 (published) (Ricoh): In an electrophotographic photoconductor comprising a photosensitive layer and an undercoat layer containing a titanium oxide and a heat hardened resin on a substrate, the volume content of the heat hardened resin contained in the undercoat layer is 0.5 to 0.6, and the average particle diameter of the titanium oxide in the undercoat layer is 0.4 $\mu$m or smaller, and a reverse development based electrophotographic apparatus utilizing the photoconductor is used.

(6) Japanese Patent Application Laid-Open No. H9-34152/1997 (published) (Konica): An electrophotographic photoconductor having an undercoat layer containing a compound selected from metal alkoxides, organic metal chelates, silane coupling agents, and reaction products thereof, and a photoconductive layer are provided in that order on an electroconductive substrate comprising a pure aluminum, an aluminum-manganese based alloy, an aluminum-magnesium based alloy, or an aluminum-magnesium-silica based alloy.

(7) Japanese Patent Application Laid-Open No. H9-292730/1997 (published) (Konica): A reverse developing electrophotographic photoconductor having an anodized layer and a photosensitive layer formed on an electroconductive substrate comprising aluminum or an aluminum alloy, the distance Sm between crests on the surface of the anodized layer is 0.3 to 250 $\mu$m with a maximum height Rt is 0.5 to 2.5 $\mu$m, and the surface gloss value in the anodized layer surface is 60 gloss or higher.

(8) Japanese Patent Application Laid-Open No. H10-83093/1998 (published) (Ricoh): An electrophotographic photoconductor having an intermediate layer containing fine titanium oxide powder in which at least zirconium oxide exists on the surface is provided in between an electroconductive substrate and a photosensitive layer.

(9) Japanese Patent Application Laid-Open No. 2000-66432 (published) (Sharp): An electrophotographic photoconductor provided by laminating an intermediate layer, an electrical charge generating layer, and an electrical charge transporting layer, in that order, on an electroconductive substrate, wherein the intermediate layer contains an adhesive resin, a carboxylate, and a titanium oxide.

With the photoconductors described in the above (1) through (9), proposals have been made for altering the configuration of or substances contained in intermediate layers formed between the electroconductive substrate and the photosensitive layer, or for providing an anodized coating film on the surface of the electroconductive substrate, and many electrophotographic photoconductors are used which have a titanium oxide contained in an intermediate layer.

However, although an intermediate layer containing a titanium oxide is formed by coating the electroconductive substrate with a coating liquid wherein the titanium oxide and a resin are dispersed in a dispersion medium, the specific gravity of a metal oxide such as the titanium oxide is larger compared to those of the resin and dispersion medium in the coating liquid. Hence, there have been problems, such as deterioration of the coating liquid after being stored for a long period of time, inability to perform uniform coating due to precipitation or cohesion of the titanium oxide particles, or marked decline in productivity due to mixture of particles in the coating film, or having to dispose of the coating liquid.

To overcome such problems, various proposals relating to dispersion methods have been made, however, no satisfying proposals have been made in terms of coating properties required for the photoconductor coating liquid. Further, related arts (1) through (9) mentioned above also fail to describe.

SUMMARY OF THE INVENTION

An object of the present invention is to overcome the problems of the related art mentioned above.

More specifically, an object of the present invention is to provide a coating liquid for intermediate layer of electrophotographic photoconductor which does not cause coating film flaws, exhibits superior coating properties, and satisfies stability, and manufacturing method thereof.

Another object of the present invention is to provide an electrophotographic photoconductor prepared by using the coating liquid for intermediate layer of electrophotographic photoconductor mentioned above which forms images of high picture quality with no image flaws, and an electrophotographic apparatus and electrophotographic process cartridge using that photoconductor.

DESCRIPTION OF THE PREFERRED EMBODIMENTS

Figure 1:
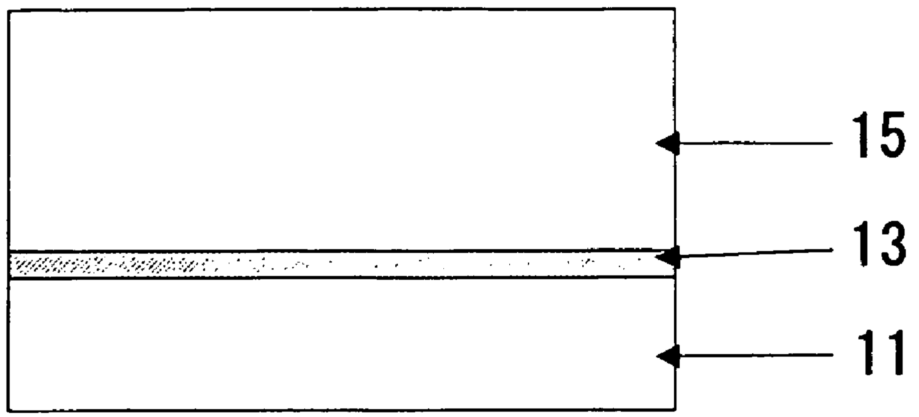
FIG. 1 is a cross-sectional view of an example configuration of an electrophotographic photoconductor.

The present invention is now described in detail herein after.

A coating liquid for intermediate layer of electrophotographic photoconductor of the present invention is used for forming an intermediate layer of an electrophotographic photoconductor, and is not particularly limited as long as a titanium oxide and a polycarboxylic acid polymer is contained in a solvent, other materials may also be contained.

The polycarboxylic acid polymer mentioned above may contain a polycarboxylic acid polymer, or an unsaturated polycarboxylic acid polymer, and either of the two.

The saturated or unsaturated polycarboxylic acid polymer is a polymer having a group represented by —COOR$^1$ and a salt thereof at the side chain or in the portion thereof, while R$^1$ represents for example, hydrogen atom, alkyl or acyl.

The saturated or unsaturated polycarboxylic polymer is formed of any of the monomers for example carboxylic acid, carboxylate, carboxylate ester, and carboxylic anhydride, or may be a copolymer of other monomers as necessary. Examples of the monomers which may be a carboxylic acid, carboxylate, carboxylate ester, and carboxylic anhydride include monovalent carboxylic acid, bivalent carboxylic acid, and carboxylic acid that has trivalent or of higher valence. The other monomers may be anything so long as it is soluble in dispersion solvent and exhibits high compatibility to binder resin as necessary. For example., acrylonitrile, acrylamide, methacrylamide, styrene, saturated or unsaturated polyethylene, cellulose, styrene sulfonic acid, methacrylic sulfonic acid, or metallic salt thereof may be used.

The polycarboxylic acid polymer having a structure below may be used for one example.

Structural Formula

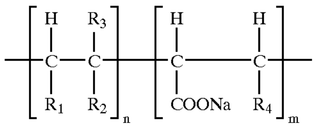

Where R$^1$, R$^2$ and R$^3$ represents hydrogen atom or substituent group such as alkyl group, and R$^4$ represents COONa, COOR$^5$ or H(R$^5$ represents alkyl)

Monovalent carboxylic acid preferably is an acrylic acid, methacrylic acid, or crotonic acid.

Specific examples of bivalent carboxylic acids include (1) fatty dicarboxylic acids having 2 to 20 carbons, such as maleic acid, fumaric acid, succinic acid, adipic acid, sebacic acid, malonic acid, azelaic acid, mesaconic acid, citraconic acid, and glutaconic acid; (2) alicyclic dicarboxylic acids having 8 to 20 carbons, such as cyclohexane dicarboxylic acid or methylmezic acid; (3) aromatic dicarboxylic acids having 8 to 20 carbons such as phthalic acid, isophthalic acid, terephthalic acid, toluene dicarboxylic acid, and naphthalene dicarboxylic acid; and (4) alkyl or alkenyl succinic acids having hydrocarbon groups having 4 to 35 carbons in a side chain such as isododecenyl succinic acid or n-dodecenyl succinic acid; as well as anhydrates and low-level-alkyl esters (such as methyl or butyl esters or the like) of those bivalent carboxylic acids.

Specific examples of polycarboxylic acids that are trivalent or of higher valence include (1) fatty polycarboxylic acids having 7 to 20 carbons such as 1,2,4-butane tricarboxylic acid, 1,2,5-hexane tricarboxylic acid, 1,3-dicarboxyl-2-methyl-2-methylene carboxypropane, tetra (methylene carboxyl) methane, 1,2,7,8-octane tetracarboxylic acid; (2) alicyclic polycarboxylic acids having 9 to 20 carbons such as 1,2,4-cyclohexane tricarboxylic acid; and (3) aromatic polycarboxylic acids having 9 to 20 carbons such as 1,2,4-benzene tricarboxylic acid, 1,2,5-benzene tricarboxylic acid; 2,5,7-naphthalene tricarboxylic acid and 1,2,4-naphthalene tricarboxylic acid, pyromellitic acid, or benzophenone tetracarboxylic acid; as well as anhydrates and low-level alkyl esters (such as methyl or butyl esters or the like) of those bivalent carboxylic acids.

These polycarboxylic acid polymer compounds are commercially available for example under the product name BYK-P104 or BYK-220S (unsaturated acidic polycarboxylic acid polyester with a polysiloxane copolymer) manufactured by BYK Chemie, or Homogenol L-18 manufactured by Kao Corporation, or as other products having similar structures.

Furthermore, based on the present invention, it is preferable from the standpoint of effectiveness that the amount of saturated or unsaturated polycarboxylic acid polymer compound added be 0.3 to 10 parts by weight in respect to 100 parts by weight of the titanium oxide contained in the coating liquid for the intermediate layer. When the amount added is within that range, it is possible to simultaneously achieve high levels of manufacturing characteristics in terms of coat ability and the like and electrophotographic characteristics in terms of abnormal images due to black specks and the like and of fluctuations in electrostatic properties, and the like.

Based on the present invention, moreover, the acid value of the saturated or unsaturated polycarboxylic acid polymer compound should be 30 to 400 mgKOH/g. When the acid value is within this range, it is possible to simultaneously achieve high levels of manufacturing characteristics in terms of coat ability and the like and electrophotographic characteristics in terms of abnormal images due to black specks and the like and of fluctuations in electrostatic properties, and the like.

In the present invention, by having the titanium oxide contained in the coating liquid for intermediate layer, the long-term dispersion stability and coating properties become very good. Although the reason for this is not clear, it is assumed to be that, although effectiveness increases by having one hydrophilic group such as the carboxyl group in an organic molecular structure exhibiting hydrophobic properties such as a hydrocarbon, even among those, a polycarboxylic acid having many carboxyl groups will have higher anionic properties, whereby wettability and adsorption properties are improved, the dispersion stability of the titanium oxide particles increase, and dispersion efficiency is markedly improved. For molecular weight of the polycarboxylic acid polymer of the present invention, 300 to 3000 number average molecular weights of oligomers or polymers are preferred, and more preferably 400 to 10000 molecular weights of the same. When the molecular weight is smaller than as defined in the range, the steric hindrance lessens at the time of being adsorbed to the filler, and tends to deteriorate the dispersibility or stability by increase in interaction between the fillers. On the other hand, when the molecular weight exceeds the above defined range, wettability and adsorptivity tends to deteriorate, and when the molecular weight is extremely large, a plurality of fillers may be adsorbed to a single polymer, thus tends to invite involuntary cohesion.

In other words, it is believed that, because a plurality of carboxyl groups contained in the polycarboxylic acid polymer compound have two functions, namely a function to adsorb to the surface of the titanium oxide, and a function to repel against carboxyl groups in the polycarboxylic acid polymer adsorbed to the titanium oxide particles, titanium oxide cohesion is three-dimensionally prevented, and also, by not being a lower molecular acid or base compound having adverse effect on the electrostatic properties, the aforementioned effect is realized without causing problems on electrostatic properties or on image.

In the present invention, by having the titanium dioxide contained in the coating liquid for intermediate layer, the following advantages are realized when formed as an intermediate layer of an electrophotographic photoconductor. That is, the refraction index for light is large and moire may be prevented, and also, in terms of electrical properties, there is little accumulation of residual electrical charge or the like, which is preferable. Particularly, from an electrostatic property perspective, the titanium oxide having purity of 98% or higher purity is used, and more preferably, the titanium oxide having purity of 99% or higher should be used.

In general, the titanium oxide may be manufactured by a sulfuric acid process or chlorine process. However, in order to obtain a high-purity titanium oxide preferably used in the present invention, the chlorine process is preferred. The chlorine process is a manufacturing process in which a raw material titanium slug is chlorinated by chlorine to make a titanium tetrachloride, which is then separated, condensed, and refined, then oxidized, after which the titanium oxide produced is pulverized, sorted, and, as necessary, subjected to a surface treatment, then filtered, washed, and dried, after which it is pulverized to make the titanium oxide. The purity of the titanium oxide may be determined by a measuring method disclosed in JIS K5116.

In the present invention, in a combination of a saturated polycarboxylic acid polymer and/or an unsaturated polycarboxylic acid polymer, the reason for particular preference to the titanium oxide having purity of 99.0% or higher is not clear. Nevertheless, that reason is believed to be that, the main impurities contained in the titanium oxide are ionized substances and hygroscopic substances such as $Na_2O$ and $K_2O$, and since the electrostatic properties tend to improve as amount of impurities grow less, and also because the impurities are not present on the surface of the powder having high purity, the saturated polycarboxylic acid polymer and/or unsaturated polycarboxylic acid polymer adhere efficiently, and enhances dispersion and electrostatic characteristics.

It is preferable that the particle diameter of the titanium oxide used be 0.02 to 0.5 $\mu$m, but not limited to this range.

The coating liquid for intermediate layer of electrophotographic photoconductor of the present invention may contain a resin, but considering to coat a photosensitive layer on the intermediate layer with a solvent, it is desirable to contain a resin which exhibits high resistance to ordinary organic solvents. Examples of such resins include water soluble resins for instance, polyvinyl alcohols, casein, and sodium polyacrylates, alcohol soluble resins such as copolymer nylons and methoxymethylized nylons, polyurethanes, melamine resins, phenol resins, alkyd-melamine resins, epoxy resins, and other hardening resins and the like that form a three-dimensional network structure.

The weight ratio between the titanium oxide and resin should be a titanium oxide/resin ratio of 3/1 to 8/1. (That is, 300 to 800 parts by weight of the titanium oxide against 100 parts by weight of the resin, is preferable.)

When the ratio is less than 3/1, the carrier transporting ability of the intermediate layer will deteriorate, a residual electric potential will develop, and the light responsiveness will deteriorate. When the ratio exceeds 8/1, the voids in the intermediate layer increase, and air bubbles will develop when the photosensitive layer is coated onto the intermediate layer.

Examples of the solvent mentioned above may be include isopropanol, acetone, methylethyl ketone, cyclohexanone, tetrahydrofuran, dioxane, dioxolane, ethyl cellusorb, ethyl acetate, methyl acetate, dichloromethane, dichloroethane, monochlorobenzene, cyclohexane, toluene, xylene, and ligroin.

The coating liquid for intermediate layer of electrophotographic photoconductor may be prepared using a ball mill, attritor, sand mill, or ultrasound or the like to disperse at least a titanium oxide and either a saturated or unsaturated polycarboxylic acid polymer in a suitable solvent.

The coating liquid for intermediate layer of the present invention may preferably be stored under 10 to 30° C. while stirred appropriately. By stirring while storing, an effectiveness of the present invention enhances, whereas, without stirring, the titanium oxide may precipitate, or the liquid properties may be modified. Under a low temperature, the resin or dispersing agent in the solvent may precipitate and the effectiveness of the present invention will not be sufficiently realized. Under high temperature, on the other hand, the solvent will vaporize or the like, making it difficult to maintain solid content or the like.

The electrophotographic photoconductor comprising at least an intermediate layer and a photosensitive layer of the present invention is not particularly limited as long as the intermediate layer contains a titanium oxide, polycarboxylic acid polymer, and electrophotoconductive substrate or components of each layer may be appropriately selected, so long as the effectiveness of the present invention is not impaired. The photosensitive layer may be a single layer, or may comprise an electric charge generating layer and an electric charge transport layer. A protective layer or the like may also be present, and may be subjected to various treatments.

The present invention is described-herein below based on the configuration of the electrophotographic photoconductor shown in the drawings.

FIG. 1 is a cross-sectional view of an example configuration of an electrophotographic photoconductor of the present invention, comprised of at least an intermediate layer 13 containing the titanium oxide and a photosensitive layer 15 laminated onto an electroconductive substrate 11.

Figure 2:
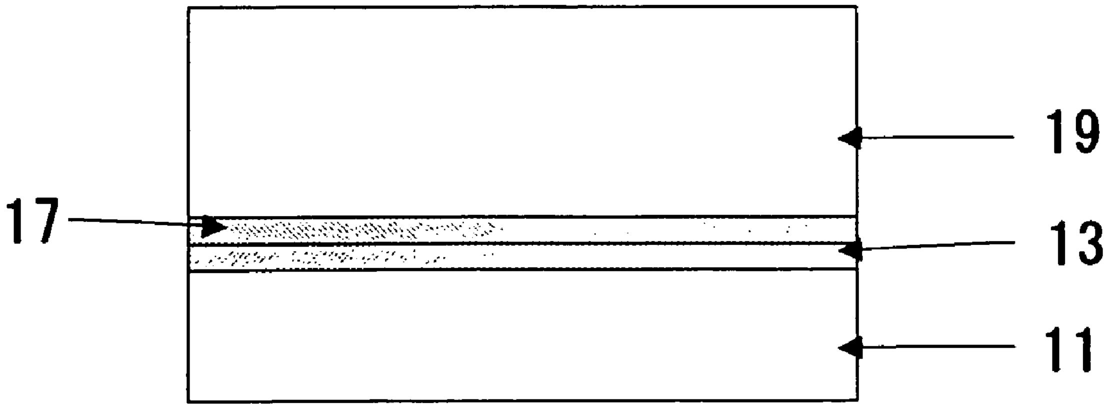
FIG. 2 is a cross-sectional view of an example configuration of an electrophotographic photoconductor having an intermediate layer, electric charge generating layer, and electric charge transporting layer are laminated on an electroconductive substrate in that order.

FIG. 2 is a cross-sectional view of an example configuration of an electrophotographic photoconductor of the present invention, comprised of at least an intermediate layer 13 containing the titanium oxide laminated onto the electroconductive substrate 11, and an electric charge generating layer 17 and electrophotographic apparatus 19 laminated thereon.

Figure 3:
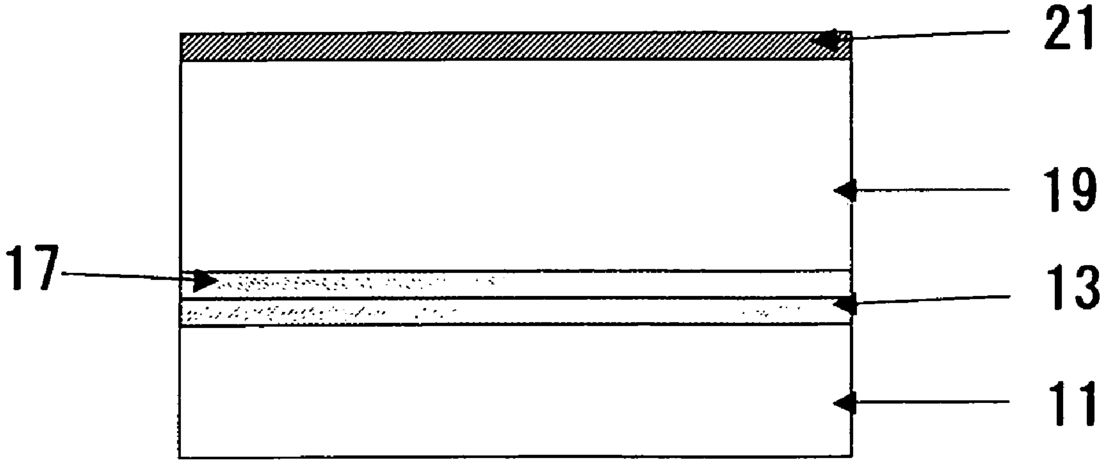
FIG. 3 is a cross-sectional view of an example configuration of an electronic photoconductor having a protective layer prepared on the electric charge transporting layer of the electrophotographic photoconductor.

FIG. 3 is a cross-sectional view of an example configuration of an electronic photoconductor of the present invention, having a protective layer 21 provided on the electrophotographic apparatus 19 of the electrophotographic photoconductor shown in FIG. 2.

The material which may be used for electroconductive substrate 11 may be materials which exhibit conductivity of a volume resistance of $10^{10}$ Ω·cm or less, formed by coating a metal such as aluminum, nickel, chromium, nickel-chromium, copper, gold, silver, or platinum or the like, or a metal oxide such as tin oxide or indium oxide or the like, for example, by vapor deposition or sputtering, onto film-form or cylindrical plastic or paper, or using a sheet of nickel or stainless steel or the like, and making that into a crude tube by extrusion or drawing or the like, and then surface-treating the tube by cutting, fine finishing, or grinding or the like.

For aluminum crude pipe, an aluminum alloy such as the types under JIS 3003, JIS 5000, or JIS 6000 or the like that has been molded into a tubular shape by a common method such as an EI, ED, DI, or II process, or that which has been subjected to surface cutting or grinding with a diamond byte or the like, or anodized or the like, may be used. The endless nickel belt and endless stainless belt disclosed in Japanese Patent Application Laid-Open No. S52-36016/1977 (published) can also be used for the electroconductive substrate 11.

Further, an electroconductive powder dispersed in an appropriate adhesive resin and coated onto the substrate may be used as the electroconductive substrate 11 of the present invention. Examples of electroconductive powders include carbon black, acetylene black, metal powders such as aluminum, nickel, iron, nickel-chromium, copper, zinc, and silver, and metal oxide powders such as electroconductive titanium oxide, electroconductive tin oxide, and ITO.

Moreover, electroconductive substrate may be an electroconductive layer is formed on a suitable cylindrical base material by a heat-contracted tube in which the electroconductive powder is contained in a raw material such as a vinyl polychloride, polypropylene, polyester, polystyrene, vinylidene polychloride, polyethylene, rubber chloride, or teflon may be suitably used as the electroconductive substrate 11 of the present invention.

For an adhesive resin utilized at the same time, thermoplastic, thermosetting resins or photo-curing resins such as a polystyrene, styrene-acrylonitrile copolymer, styrene-butadiene copolymer, styrene-anhydrous maleic acid copolymer, polyester, vinyl polychloride, vinyl chloride-vinyl acetate copolymer, vinyl polyacetate, vinylidene polychloride, polyallylate, phenoxy resin, polycarbonate, cellulose acetate resin, ethyl cellulose resin, polyvinyl butyral, polyvinyl formal, polyvinyl toluene, poly-N-vinyl carbazol, acrylic resin, silicone resin, epoxy resin, melamine resin, urethane resin, phenol resin, or alkyd resin may be used. Such electroconductive layers may be provided by dispersing the electroconductive powders and adhesive resins in a suitable solvent, such as tetrahydrofuran, dichloromethane, 2-butanone, or toluene, and coating it thereon.

The intermediate layer 13 preferably contains the titanium oxide and a polycarboxylic acid polymer, and contains a resin.

For the polycarboxylic acid polymer, the titanium oxide, and the resin mentioned above, those mentioned in the coating liquid for intermediate layer of electrophotographic photoconductor may be used.

The intermediate layer 13 may be formed by coating the coating liquid for intermediate layer of electrophotographic photoconductor onto the electroconductive substrate 11 and drying thereafter.

For a method of coating the coating liquid, an immersion coating process, spray coating, beat coating, nozzle coating, spinner coating, or ring coating and the like may be used. The film thickness of the intermediate layer 13 appropriately is 0.5 to 10 μm.

The electric charge generating layer 17 contains at least an electric charge generating substance and, as necessary, an adhesive resin. Examples of such adhesive resin include polyamides, polyurethanes, epoxy resins, polyketones, polycarbonates, silicone resins, acrylic resins, polyvinyl butyrals, polyvinyl formals, polyvinyl ketones, polystyrenes, polysulfones, poly-N-vinyl carbazols, polyacrylamides, polyvinyl benzals, polyesters, phenoxy resins, vinyl chloride-vinyl acetate copolymers, polyvinyl acetates, polyphenylene oxides, polyamides, polyvinyl pyridines, cellulose-based resins, casein, polyvinyl alcohols, and polyvinyl pyrrolidones. An appropriate quantity of the adhesive resin is 0 to 500 parts by weight, preferably 10 to 300 parts by weight in respect to 100 parts by weight of the electrical charge generating substance.

For the electrical charge generating substance, a pyrrolidon based pigment such as a metallic phthalocyanine or non-metallic phthalocyanine, or an azulenium salt pigment, methyl squarate pigment, perylene based pigment, anthraquinone based or polycyclic quinone based pigment, quinone-imine based pigment, diphenylmethane and triphenylmethane based pigment, benzoquinone and naphthoquinone based pigment, cyanine and azomethine based pigment, indigoid based pigment, bisbenzimidazol based pigment, or monoazo pigment, bisazo pigment, asymmetrical bisazo pigment, trisazo pigment, tetraazo pigment, or other azo pigment, may be used. Specific examples of azo pigments that may be cited include azo pigments having a carbazol skeleton (described in Japanese Patent Application Laid-Open No. S53-95033/1978 (published)), azo pigments having a triphenylamine skeleton (described in Japanese Patent Application Laid-Open No. S53-132547/1978 (published)), azo pigments having a stilbene skeleton (described in Japanese Patent Application Laid-Open No. S53-138229/1978 (published)), azo pigments having a dibenzothiophene skeleton (described in Japanese Patent Application Laid-Open No. S54-21728/1979 (published)), azo pigments having a fluorolenone skeleton (described in Japanese Patent Application Laid-Open No. S54-22834/1979 (published)), azo pigments having an oxadiazole skeleton (described in Japanese Patent Application Laid-Open No. S54-12742/1979 (published)), azo pigments having a bis-stilbene skeleton (described in Japanese Patent Application Laid-Open No. S54-17733/1979 (published)), azo pigments having a distyryloxadiazole skeleton (described in Japanese Patent Application Laid-Open No. S54-2129/1979 (published)), and azo pigments having a distyrylcarbazole skeleton (described in Japanese Patent Application Laid-Open No. S54-17734/1979 (published)).

The electric charge generating layer 17 is formed by dispersing at least an electrical charge generating substance and, as necessary, an adhesive resin in a suitable solvent using a ball mill, attritor, sand mill, or ultrasound or the like to prepare a coating liquid, coating the coating liquid on intermediate layer 13, and drying thereafter. Examples of solvents that may be used herein includes, for example, isopropanol, acetone, methylethylketone, cyclohexanone, tetrahydrofuran, dioxane, dioxolane, ethyl cellusorb, ethyl acetate, methyl acetate, dichloromethane, dichloroethane, monochlorobenzene, cyclohexane, toluene, xylene, and ligroin.

For a method of coating the coating liquid, an immersion coating process, spray coating, beat coating, nozzle coating, spinner coating, or ring coating or like may be used. The suitable film thickness of the electric charge generating layer 17 is 0.01 to 5 μm or so, and preferably 0.1 to 2 μm.

The electric charge transportation layer 19 is a layer which mainly comprises an electric charge transporting substance. This layer may be formed by dissolving or dispersing the electric charge transporting substance and a binder resin in a suitable solvent such as tetrahydrofuran, dioxane, dioxolane, anisole, toluene, monochlorobenzene, dichloroethane, methylene chloride, or cyclohexanone, and coating the solution or dispersion liquid, and drying thereafter.

Among electric charge transporting substances there are positive hole transporting substances and electron transporting substances. As electron transporting substances, such known electron accepting substances as chloranile, bromanile, tetracyanoethylene, tetracyanoquinodimethane, 2,4,7-trinitro-9-fluorolenone, 2,4,5,7-tetranitroxanthone, 2,4,8-trinitrothioxanthone, 2,6,8-trinitro-4H-indeno [1,2-b] thiophene-4-one, 1,3,7-trinitrodibenzothiophene-5,5-dioxide, and 3,5-dimethyl-3',5'-ditertiary butyl-4,4'-diphenoquinone may be cited. These electron transporting substances may be used alone or in mixtures of two or more types.

Examples of positive hole transporting substances include poly-N-vinyl carbazoles and derivatives thereof, poly-y-carbazolylethyl glutamates and derivatives thereof, pyrene-formaldehyde condensates and derivatives thereof, polyvinyl pyrenes, polyvinyl phenanthrolires, polysilanes, oxazole derivatives, oxadiazole derivatives, imidazole derivatives, monoalylamine derivatives, dialylamine derivatives, trialylamine derivatives, stilbene derivatives, α-phenylstilbene derivatives, benzidine derivatives, dialylmethane derivatives, trialylmethane derivatives, 9-styrylanthracene derivatives, pyrazoline derivatives, pyrene derivatives, bisstilbene derivatives, enamine derivatives, thiazole derivatives, triazole derivatives, phenazine derivatives, acridine derivatives, benzofuran derivatives, benzimidazole derivatives, and thiophene derivatives. These positive hole transporting substances may be used alone or in mixtures of two or more types.

Example of an adhesive resin used in the electric charge transport layer includes thermoplastic or thermosetting resins such as polystyrenes, styrene-acrylonitrile copolymers, styrene-butadiene copolymers, styrene-anhydrous maleic acid copolymers, polyesters, polyvinyl chlorides, vinyl chloride-vinyl acetate copolymers, polyvinyl acetates, polyvinylidene chlorides, polyallylates, phenoxy resins, polycarbonates (type A bisphenol, type Z bisphenol, and the like), cellulose acetate resins, ethyl cellulose resins, polyvinyl butyrols, polyvinyl formals, polyvinyl toluenes, poly-N-vinyl carbazoles, acrylic resins, silicone resins, epoxy resins, melamine resins, urethane resins, phenol resins, alkyd resins, and the various polycarbonate copolymers disclosed in Japanese Patent Application Laid-Open No. H5-158250/1993 (published) and Japanese Patent Application Laid-Open No. H6-51544/1994 (published).

For an adhesive resin, a macromolecular electric charge transporting substance which exhibit functions of both an adhesive resin and a charge transporting substance may be used. For such macromolecular electric charge transporting substances, those mentioned hereinafter may be used.

(a) A polymer comprising a carbazol ring in the main chain and/or in a side chain, for example, such as poly-N-vinylcarbazole or compounds disclosed in Japanese Patent Application Laid-Open No. S50-82056/1975 (published), Japanese Patent Application Laid-Open No. S54-9632/1979 (published), Japanese Patent Application Laid-Open No. S54-11737/1979 (published) and Japanese Patent Application Laid-Open No. H4-183719/1992 (published).

(b) A polymer comprising a hydrazone structure in the main chain and/or in a side chain, for example, such as compounds described in Japanese Patent Application Laid-Open No. S57-78402/1982 (published) and Japanese Patent Application Laid-Open No. H3-50555/1991 (published).

(c) Polysilylene polymers such as compounds described in Japanese Patent Application Laid-Open No. S63-285552/1988 (published), Japanese Patent Application Laid-Open No. H5-19497/1993 (published), and Japanese. Patent Application Laid-Open No. H5-70595/1993 (published).

(d) Polymers having a tertiary amine structure in the main chain and/or in a side chain, such as N,N-bis(4-methylphenyl)-4-aminopolystyrene or compounds described in Japanese Patent Application Laid-Open No. H1-13061/1989 (published), Japanese Patent Application Laid-Open No. H1-19049/1989 (published), Japanese Patent Application Laid-Open No. H1-1728/1998 (published), Japanese Patent Application Laid-Open No. H1-105260/1989 (published), Japanese Patent Application Laid-Open No. H2-167335/1990 (published), Japanese Patent Application Laid-Open No. H5-66598/1993 (published), and Japanese Patent Application Laid-Open No. H5-40350/1993 (published).

A suitable amount of adhesive resin for use is 0 to 150 parts by weight in respect to 100 parts by weight of electric charge transporting substance.

Moreover, a plasticizer, leveling agent, or antioxidant or the like may be added to the electric charge transport layer as necessary. Examples of such a plasticizer include paraffin halides, dimethyl naphthalene, dibutyl phthalate, dioctyl phthalate, and tricresyl phosphate, and polyester polymers and copolymers and the like. Leveling agents usable include silicon oils such as dimethyl silicone oil and methylphenyl silicone oil, and polymers or oligomers which have a perfluoroalkyl group in a side chain, and an appropriate quantity for use is 0 to 1 part by weight or so relative to the binder resin. Antioxidants that may be used include hindered phenyl based compounds, sulfur based compounds, phosphorous based compounds, hindered amine based compounds, pyridine derivatives, piperidine derivatives, and morpholine derivatives, with an appropriate quantity for use being 0 to 5 parts by weight or so to 100 parts by weight of the adhesive resin.

An appropriate film thickness of the electric charge transport layer formed in this method is 5 to 50 μm or the like.

The photosensitive layer 15 of a single layer type photoconductor comprises an electric charge generating substance a dispersing agent of the present invention, electric charge transporting substance, and adhesive resin. The materials mentioned above may be used for an electrical charge generating substance, dispersing agent, and electric charge transporting substance. In order to form such a single layer type photosensitive layer, it is only necessary to dissolve or disperse the electrical charge generating substance, electric charge transporting substance, dispersing agent, and adhesive resin in a suitable solvent such as tetrahydrofuran, cyclohexanone, dioxane, dichloroethane, or butanone, using a ball mill, attritor, or sand mill or the like, diluting as appropriate, then coating, and drying the resultant sample. The coating is performed using an immersion coating process, spray coating process, roll coating process, or blade coating process and the like.

For the adhesive resin, the adhesive resins mentioned as adhesive resins for the electric charge transport layer may be used as they are, or may be mixed with adhesive resins in the examples for the electric charge generating layer. It is also possible to form a single layer type photosensitive layer having an electric charge transporting substance added thereto on a eutectic complex formed from a pyrillium based dye and a bisphenol A type polycarbonate, by a similar coating process as mentioned above, using a suitable solvent.

Further, to the single layer type photosensitive layer, a plasticizer, leveling agent, or antioxidant or the like may be added as necessary. The film thickness of the single layer type photosensitive layer formed in this way suitably is 5 to 50 μm and the like.

For the purpose of enhancing the durability of the photoconductor, the protective layer 21 may be added with resins such as ABS resins, ACS resins, olefin-vinylmonomer copolymers, polyethyl chlorides, allyl resins, phenol resins, polyacetals, polyamides, polyamide-imides, polyacrylates, polyallyl sulfones, polybutyrenes, polybutyrene terephthalates, polycarbonates, polyether sulfones, polyethylenes, polyethylene terephthalates, polyimides, acrylic resins, polymethyl pentanes, polypropylenes, polyphenylene oxides, polysulfones, polystyrenes, AS resins, butadiene-styrene copolymers, polyurethanes, polyvinyl chlorides, polyvinylidene chlorides, epoxy resins, and polyesters.

For the purpose of enhancing wear resistance of the protective layer 21, fluorine resins such as polytetrafluoroethylene, silicone resins, or such inorganic materials as titanium oxide, aluminum oxide, tin oxide, zinc oxide, zirconium oxide, magnesium oxide, silica, and surface treated inorganic materials may be added, and it is further possible to add an electric charge transporting substance.

An ordinary coating process may be used as the method for forming the protective layer 21. The thickness of the protective layer 21 may suitably be 0.1 to 10 μm.

Moreover, known materials such as a-C or a-SiC formed by a vacuum thin film preparation process may be used for the protective layer 21.

Alternatively, in the present invention, an other intermediate layer (not shown in the drawings) may be provided in between the photosensitive layer 15 and the protective layer 21.

In the other intermediate layer, generally a resin is the main component. Examples of such resins include polyamides, alcohol soluble nylon resins, water soluble butyral resins, polyvinyl butyrals, and polyvinyl alcohols.

For a method of forming the other intermediate layer, a known coating process mentioned above may be used. A film thickness appropriately is 0.05 to 2 μm.

Next, an electrophotographic apparatus and an electrophotographic apparatus process cartridge of the present invention will be described.

Figure 4:
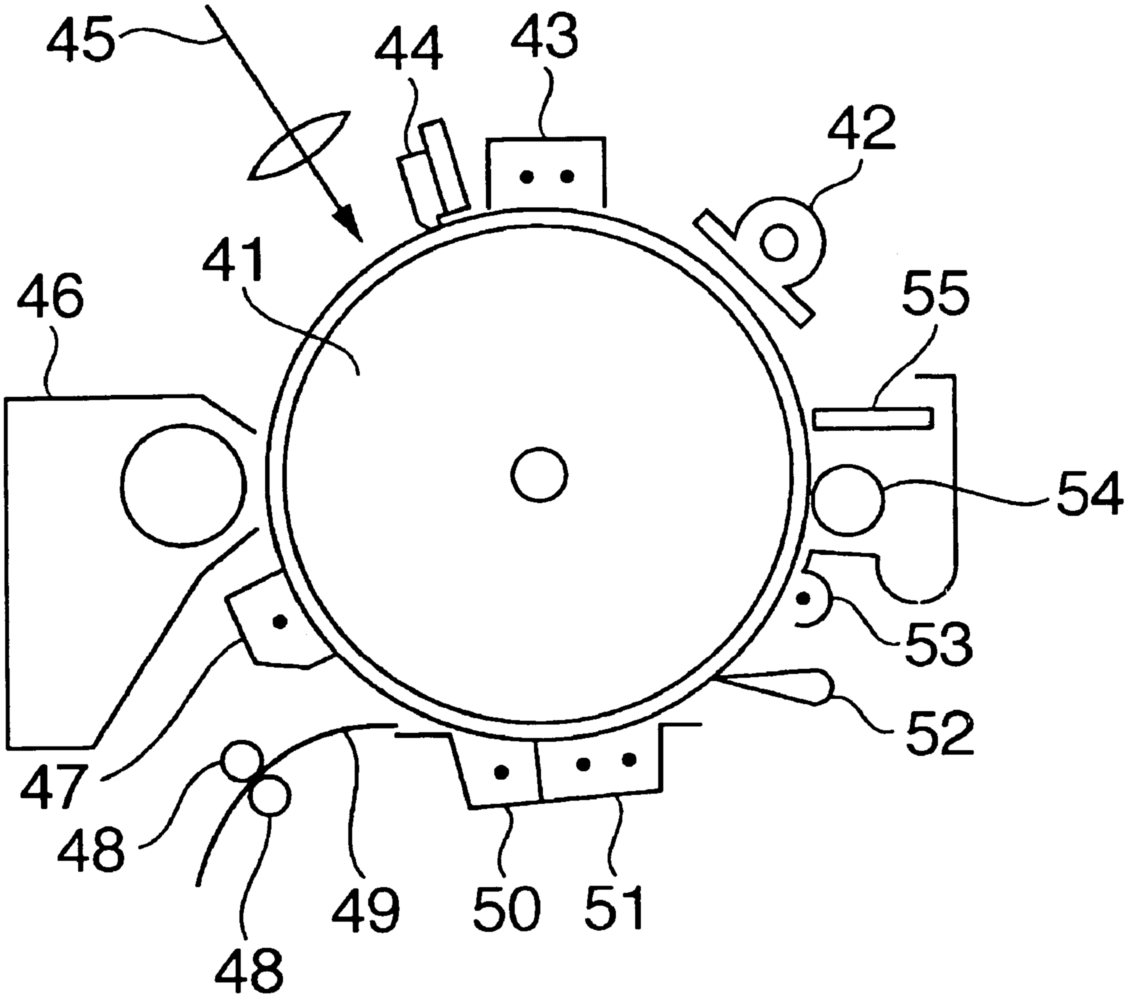
FIG. 4 is a schematic view of an example configuration of an electrophotographic apparatus.

FIG. 4 is a schematic view of an electrophotographic apparatus of the present invention, which also covers modified examples described below within the scope of the present invention.

In FIG. 4, the a photoconductor 41 is provided with a photosensitive layer formed as a film using a dispersion liquid prepared by the method above mentioned on an electroconductive substrate. The photoconductor 41 has a form of drum, but may be formed as a sheet or endless belt. For an electrostatic charger 43, pre-transfer charger 47, transfer charger 50, separation charger 51, pre-cleaning charger 53, corotron, scorotron, solid-state charger, and charging roller, known methods could be used.

For the transfer, the chargers in general mentioned above may be used.

For the light source for the image exposure unit 45 and decharging lamp 42 and the like, a tungsten lamp, halogen lamp, mercury lamp, sodium lamp, light emitting diode (LED), semiconductor laser (LD), or a common light emitting substance such as electro-luminescence (EL) may be used. In order to irradiate a light of a desired wavelength, any of various filters such as a sharp cutting filter, band pass filter, near infrared cutting filter, dichroic filter, interference filter, or light-temperature conversion filter may be used.

Such a light source or the like may be used not only in the process shown in FIG. 4, but also in a transfer process which utilize light irradiation, decharging process, cleaning process, or process for pre-exposure or the like.

Toner developed on the photoconductor 41 by a developing unit 46 is transferred to transfer paper 49, however, not all of the toner is transferred, leaving some of the toners remained on the photoconductor 41.

The remained toner is removed from the photoconductor by a cleaning brush 54 and cleaning blade 55. The cleaning is performed sometimes by a cleaning blade or by a cleaning brush, and a commonly known brush such as a fur brush or magnetic fur brush may also be used for the cleaning brush. When the developing unit performs a function of cleaning, there is no need to provide cleaning units such as the cleaning brush 54 or cleaning blade 55.

In the drawing, reference numeral 52 indicates a separating pawl, 44 indicates an eraser, and 48 indicates resist rollers.

When a positive (negative) charge is exerted on the electrophotographic photoconductor and image exposure is performed, a positive (negative) latent electrostatic image is formed on the photoconductor surface. If this is developed with toner of negative (positive) polarity, a positive image is obtained, whereas if it is developed with a toner of positive (negative) polarity, a negative image is obtained. A known process may be applied for such developer, and also a known process may be used in the decharger.

The electrophotographic apparatus shown in the drawing exemplifies an aspect of the present invention, and other aspects are also possible. For example, the image forming means comprising the electrophotographic apparatus may be built into the apparatus inside a copier machine, facsimile machine, or printer in the form of a process cartridge. "Process cartridge" herein is defined as a single device (component) which comprises, in addition to a photoconductor, includes chrger, light irradiator, image developer, transfer, cleaner, and decharger. Many forms of process cartridge have been disclosed, among them, a cartridge used in the Imagio MF 200 (made by Ricoh Co., Ltd.) is shown in FIG. 5 as common example.

Figure 5:
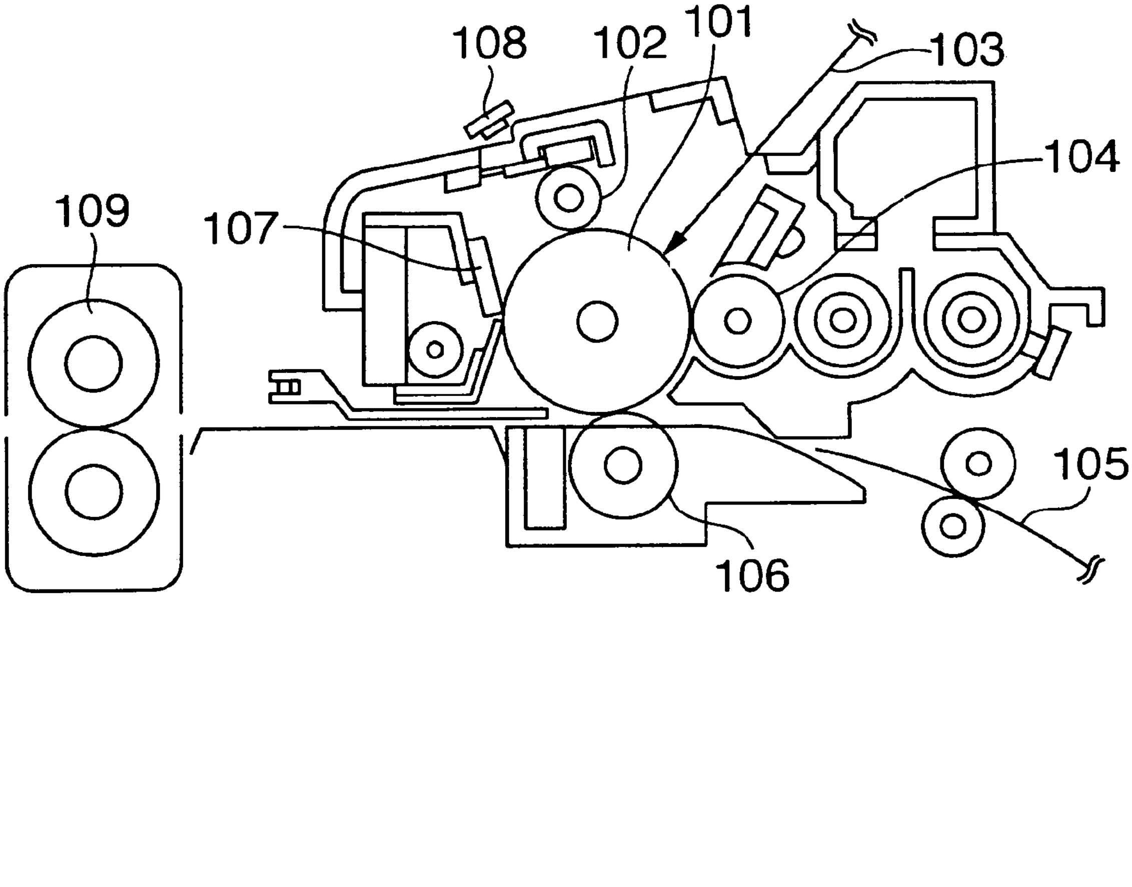
FIG. 5 is a schematic view of an example configuration of another electrophotographic apparatus.

FIG. 5 is a diagram representing one example of an electrophotographic apparatus where an electrophotographic process cartridge is used. The description for the apparatus is omitted.

In the figure, reference numeral 101 represents an electrophotographic photoconductor. First of all, the photoconductor is charged by a charging device 102. After the photoconductor has been charged, exposing light 103 is irradiated, and generates electric charge on the exposed portion, and a latent electrostatic image is formed on the photoconductor surface. The latent electrostatic image formed contacts the developer in the developing device 104, and a toner image is formed. The toner image formed on the photoconductor surface is transferred to a transfer material 105 such as paper, by a transfer device 106, and passes through a fixing device 109 to create a hard copy. The residual toner on the electrophotographic photoconductor 101 is removed by a cleaning blade 107, the residual electric charge is removed by a decharging lamp 108, and moves on to the next electrophotographic cycle.

In this apparatus, the transfer material 105, transfer device 106, decharging lamp 108, and fixing device 109 are not included in the cartridge portion.

On the other hand, in the light irradiation process, image exposure, pre-cleaning exposure, and decharging exposure are shown in FIG. 4, but it is also possible to provide, pre-transfer exposure, exposure in advance of image exposure, and other commonly known light irradiating processes in irradiating light to photoconductors Next, the present invention is described by reference to embodiments, the present invention is not limited to these embodiments. In the embodiments, the term "parts" refers to "parts by weight."

<Embodiment 1>

A mixture comprising 70 parts by weight of titanium oxide having purity of 99.97% (CR-EL, manufactured by Ishihara Sangyo Kaisha, Ltd.), 18 parts by weight of an alkyd resin (Bekkolite M6401-50-S (50% solids), manufactured by Dainippon Ink and Chemicals, Inc.), 10 parts by weight of a melamine resin (Super Bekkamine G-821-60 (60% solids), manufactured by Dainippon Ink and Chemicals, Inc.), 100 parts by weight of methylethylketone, and 2.0 parts by weight of unsaturated polycarboxylic acid polymer (BYK-P104, manufactured by BYK Chemie) having an acid value of 180 mgKOH/g was dispersed for 72 hours in a ball mill to prepare an coating liquid for intermediate layer (U-1). The resultant sample was coated on an aluminum drum having a 30 mm diameter and 340 mm long, and dried for 20 minutes under 130° C., to form an intermediate layer having a film thickness of 4.5 $\mu$m.

Next, 10 parts of the trisazo pigment expressed by the following structural formula I was added to the resin solution of 4 parts polyvinyl butyral (BM-1, made by Sekisui Chemical Co., Ltd.) dissolved in 150 parts cyclohexanone, and dispersed for 72 hours in a ball mill. After the dispersion, 210 parts of cyclohexanone were added and dispersed for 3 hours, and obtained a coating liquid for an electric charge generating layer. The coating liquid was coated on the intermediate layer, and dried for 10 minutes under 130° C. to earn an electric charge generating layer having a film thickness of 0.2 $\mu$m. Next, 7 parts of compound expressed by structural formula II below, 10 parts of polycarbonate resin (Yupron Z300, made by Mitsubishi Gas Chemical Co., Ltd.), and 0.002 parts of silicone oil (KF-50, made by Shin-Etsu Chemical Co., Ltd.) were dissolved in 100 parts of tetrahydrofuran to obtain a coating liquid for coating electric charge transport layer. The coating liquid was coated on the electric charge generating layer, and dried for 20 minutes under 135° C. to earn an electric charge transport layer having an average film thickness of 25 $\mu$m, thus an electrophotographic photoconductor was formed.

Structural Formula I

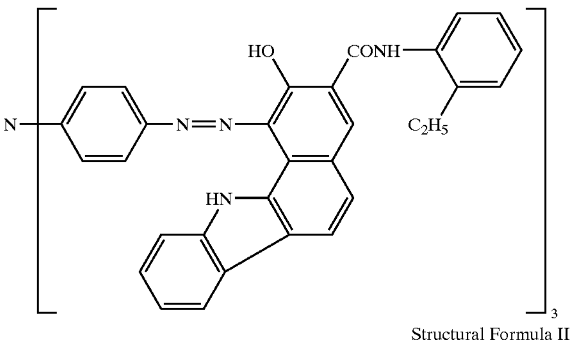

Structural Formula II

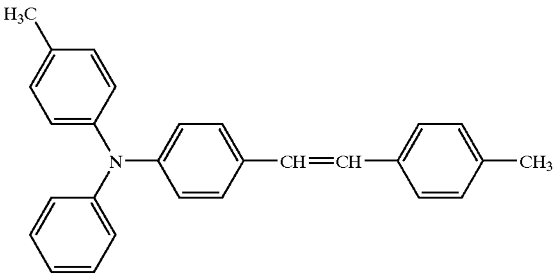

The coating liquid U-1 and electrophotographic photoconductor in Embodiment 1, thus obtained, were evaluated as follows. The coating liquid for intermediate layer used in the electrophotographic photoconductor evaluation was a liquid freshly acquired.

First, particle diameters, coating properties, and dispersion stability of the coating liquid were evaluated.

For particle diameters, average particle diameters were measured using a CAPA 700 (manufactured by Horiba, Ltd.) at 2000 r.p.m. An average particle diameter of the coating liquid U-1, was 0.40 μm.

For liquid dispersion stability, the coating liquid for intermediate layer was poured into a settling tube 10 cm high, still standed vertically for one month, and the dispersion stability was evaluated by a volume of precipitation, which is by the length of supernatant developed in the coating liquid. In other words, it could be determined that the smaller the length of the supernatant, the better the dispersion stability. For the coating liquid U-1, the length of the supernatant was 20 mm.

For coating properties, the numbers of particles created by undispersed pigments or cohesion of 0.5 mm diameter or greater in the coated intermediate layer were observed visually. For the coating liquid U-1, evaluation was conducted respectively at the time of initial preparation, after stored for 3 months, and after stored for 6 months, under room temperature (23±2° C.). In every case the number of particles was zero.

For the electrophotographic photoconductor, images were evaluated using the Imagio MF250M (made by Ricoh Co., Ltd.).

First, for the image evaluations, after a continuous run of 20,000 sheets, the numbers of black specks of 0.5 mm or greater on white A4 paper and the incidence of other image abnormalities were examined. For the coating liquid U-1, evaluation was conducted on photoconductors coated with liquid respectively at the time of initial preparation, after being stored for 3 months, and after being stored for 6 months, under room temperature (23±2° C.) subject to stirring, and no black specks and no image abnormalities were found. For electrostatic properties of the photoconductor, the electric potential on the unexposed portion, VD (−V), and the electric potential on the exposed portion, VL (−V), were measured, using the Imagio MF250M (made by Ricoh Co., Ltd.), initially and after a continuous run of 20,000 sheets, with a voltage of −1680 V applied to the charging roller.

<Embodiment 2>

Other than altering the amount of unsaturated polycarboxylic acid polymer (BYK-P104, manufactured by BYK Chemie) used as a dispersing agent in the coating liquid for intermediate layer to 0.5 parts by weight, the coating liquid (U-2) and the electrophotographic photoconductor used in this embodiment were prepared in the same way as in Embodiment 1, and evaluation was conducted in the same way as in Embodiment 1.

<Embodiment 3>

Other than altering the amount of unsaturated polycarboxylic acid polymer (BYK-P104, manufactured by BYK Chemie) used as dispersing agent in the coating liquid for intermediate layer to 5.0 parts by weight, the coating liquid (U-3) and the electrophotographic photoconductor used in this embodiment were prepared in the same way as in Embodiment 1, and evaluation was conducted in the same way as in Embodiment 1.

<Embodiment 4>

Other than using an unsaturated acidic polycarboxylic acid polyester with a polysiloxane copolymer (BYK-220S, manufactured by BYK Chemie) having an acid value of 100 mgKOH/g as the dispersing agent in the coating liquid for intermediate layer, the coating liquid (U-4) and the electrophotographic photoconductor used in this embodiment were prepared in the same way as in Embodiment 1, and evaluation was conducted in the same way as in Embodiment 1.

<Embodiment 5>

Other than using a polycarboxylic acid polymer (BYK-104S, manufactured by BYK Chemie) having an acid value of 100 mgKOH/g as the dispersing agent in the coating liquid for intermediate layer, the coating liquid (U-5) and the electrophotographic photoconductor used in this embodiment were prepared in the same way as in Embodiment 1, and evaluation was conducted in the same way as in Embodiment 1.

<Embodiment 6>

Other than using an unsaturated acidic polycarboxylic acid polyester, anionic (Bykumen, 46% solids, manufactured by BYK Chemie) having an acid value of 35 mgKOH/g as the dispersing agent in the coating liquid for intermediate layer, the coating liquid (U-6) and the electrophotographic photoconductor used in this embodiment was prepared in the same way as in Embodiment 1, and evaluation was conducted in the same way as in Embodiment 1.

<Embodiment 7>

Other than using an unsaturated polycarboxylic acid polymer, anionic (BYK-P105, 98% solids, manufactured by BYK Chemie) having an acid value of 365 mgKOH/g as the dispersing agent in the coating liquid for intermediate layer, the coating liquid (U-7) and the electrophotographic photoconductor used in this embodiment were prepared in the same way as in Embodiment 1, and evaluation was conducted in the same way as in Embodiment 1.

<Embodiment 8>

Other than using a polycarboxylic acid polymer having an acid value of 20 mgKOH/g as the dispersing agent in the coating liquid for intermediate layer, the coating liquid (U-8) and the electrophotographic photoconductor used in this embodiment were prepared in the same way as in Embodiment 1, and evaluation was conducted in the same way as in Embodiment 1.

<Embodiment 9>

Other than using a polycarboxylic acid polymer having an acid value of 500 mgKOH/g as the dispersing agent in the coating liquid for intermediate layer, the coating liquid (U-9) and the electrophotographic photoconductor used in this embodiment were prepared in the same way as in Embodiment 1, and evaluation was conducted in the same way as in Embodiment 1.

<Embodiment 10>

Other than using the titanium oxide of 99.0% purity instead of CR-EL as the titanium oxide used in the coating liquid for intermediate layer, the coating liquid (U-10) and the electrophotographic photoconductor in this embodiment were prepared in the same way as in Embodiment 1, and evaluation was conducted in the same way as in Embodiment 1.

<Embodiment 11>

Other than using the titanium oxide of 98.0% purity instead of CR-EL as the titanium oxide used in the coating liquid for intermediate layer, the coating liquid (U-11) and the electrophotographic photoconductor used in this embodiment were prepared in the same way as in Embodiment 1, and evaluation was conducted in the same way as in Embodiment 1.

COMPARATIVE EXAMPLE 1

Except omitting polycarboxylic acid-polymer in the coating liquid for intermediate layer, the coating liquid (H-1) and the electrophotographic photoconductor used in this embodiment were prepared as in Embodiment 1, and evaluations were conducted as in Embodiment 1.

COMPARATIVE EXAMPLE 2

Other than using a denatured acrylic block copolymer (Disperbyk-2000, made by BYK Chemie) having an amine value of 4 mgKOH/g and an acid value of 0 mgKOH/g as the dispersing agent in the coating liquid for intermediate layer, the coating liquid (H-2) and the electrophotographic photoconductor used in this embodiment were prepared in the same way as in Embodiment 1, and evaluation was conducted in the same way as in Embodiment 1.

COMPARATIVE EXAMPLE 3

Other than using a basic macromolecular copolymer (Adisper PB711, made by Ajinomoto Fine-Techno Co., Inc) having an acid value of 0 mgKOH/g as the dispersing agent in the coating liquid for intermediate layer, the coating liquid (H-3) and the electrophotographic photoconductor used in this embodiment were prepared in the same way as in Embodiment 1, and evaluation was conducted in the same way as in Embodiment 1.

COMPARATIVE EXAMPLE 4

Other than using a macromolecular block copolymer (Disperbyk-160, made by BYK Chemie) having an amine value of 12 mgKOH/g as the dispersing agent in the coating liquid for intermediate layer, the coating liquid (H-4) and the electrophotographic photoconductor used in this embodiment were prepared in the same way as in Embodiment 1, and evaluation was conducted in the same way as in Embodiment 1.

COMPARATIVE EXAMPLE 5

Other than using an anionic block copolymer (DisperByk-111, 90% or more solids, made by BYK Chemie) having an acid value of 129 mgKOH/g as the dispersing agent in the coating liquid for intermediate layer, the coating liquid (H-5) and the electrophotographic photoconductor used in this embodiment were prepared in the same way as in Embodiment 1, and evaluation was conducted in the same way as in Embodiment 1.

The result of evaluations for the coating liquid for intermediate layer and electrophotographic photoconductors of Embodiment 1 through 11 and Comparative Examples 1 through 5 described above are shown below.

In Table 1, the result of evaluations regarding particle diameters, dispersion stability (supernatant), numbers of particles, and numbers of black specks are shown.

In Table 2, the result of evaluations for the electrostatic properties using Imagio MF250M (made by Ricoh Co., Ltd.) are shown.

TABLE 1

| | Result of coating properties and images | | | | | | | |
|---|---|---|---|---|---|---|---|---|
| | particle | | number of particles | | | number of black spots | | |
| | diameter (μm) | supernatant (mm) | initially | after 3 months | after 6 months | initially | after 3 months | after 6 months |
| Embod. 1 | 0.4 | 20 | 0 | 0 | 0 | 0 | 0 | 0 |
| Embod. 2 | 0.42 | 28 | 0 | 3 | 5 | 1 | 5 | 10 |
| Embod. 3 | 0.4 | 15 | 0 | 3 | 0 | 0 | 0 | 0 |

TABLE 1-continued

Result of coating properties and images

| | particle diameter (μm) | supernatant (mm) | number of particles initially | number of particles after 3 months | number of particles after 6 months | number of black spots initially | number of black spots after 3 months | number of black spots after 6 months |
|---|---|---|---|---|---|---|---|---|
| Embod. 4 | 0.45 | 35 | 0 | 3 | 5 | 1 | 4 | 10 |
| Embod. 5 | 0.4 | 18 | 0 | 0 | 0 | 0 | 0 | 0 |
| Embod. 6 | 0.4 | 20 | 0 | 3 | 5 | 1 | 4 | 10 |
| Embod. 7 | 0.4 | 20 | 0 | 0 | 0 | 0 | 0 | 0 |
| Embod. 8 | 0.45 | 35 | 0 | 3 | 9 | 2 | 5 | 15 |
| Embod. 9 | 0.38 | 10 | 0 | 0 | 0 | 0 | 0 | 0 |
| Embod. 10 | 0.4 | 20 | 0 | 0 | 0 | 0 | 0 | 0 |
| Embod. 11 | 0.45 | 20 | 0 | 3 | 5 | 0 | 3 | 5 |
| Comp. Ex. 1 | 0.52 | 52 | 3 | 20 | 30 | 15 | 38 | 60 |
| Comp. Ex. 2 | 0.52 | 52 | 3 | 15 | 25 | 10 | 25 | 35 |
| Comp. Ex. 3 | 0.51 | 50 | 2 | 5 | 20 | 5 | 20 | 30 |
| Comp. Ex. 4 | 0.45 | 30 | 0 | 3 | 5 | 1 | 5 | 10 |
| Comp. Ex. 5 | 0.52 | 52 | 3 | 20 | 30 | 15 | 38 | 60 |

Table 1: Result of evaluation for coating properties and images

TABLE 2

Result of evaluation for electrostatic properties

| | Initially VD(−V) | Initially VL(−V) | After 20,000 copies VD(−V) | After 20,000 copies VL(−V) | Evaluation of image |
|---|---|---|---|---|---|
| Embod. 1 | 900 | 120 | 900 | 120 | good |
| Embod. 2 | 905 | 120 | 900 | 130 | good |
| Embod. 3 | 890 | 110 | 880 | 100 | good |
| Embod. 4 | 900 | 120 | 905 | 125 | good |
| Embod. 5 | 900 | 120 | 900 | 120 | good |
| Embod. 6 | 900 | 120 | 900 | 125 | good |
| Embod. 7 | 890 | 115 | 875 | 120 | good |
| Embod. 8 | 900 | 120 | 910 | 130 | good |
| Embod. 9 | 885 | 115 | 840 | 115 | slightly smudged |
| Embod. 10 | 900 | 125 | 900 | 130 | good |
| Embod. 11 | 900 | 135 | 900 | 155 | good |
| Comp. Ex. 1 | 900 | 120 | 870 | 110 | many black specks |
| Comp. Ex. 2 | 900 | 170 | 930 | 250 | decreased density/many black specks |
| Comp. Ex. 3 | 910 | 160 | 940 | 280 | decreased density |
| Comp. Ex. 4 | 920 | 180 | 950 | 280 | decreased density |
| Comp. Ex. 5 | 920 | 180 | 945 | 290 | decreased density/many black specks |

Embodiment 1–11

COMPARATIVE EXAMPLE 1–5

As is clear from the result mentioned above, in a titanium oxide containing coating liquid for intermediate layer, when a saturated or unsaturated polycarboxylic acid polymer is utilized as dispersing agent, a coating liquid for intermediate layer which exhibits outstanding dispersion stability and coating properties may be prepared, and electrophotographic photoconductors that are good in terms of both image quality and electrostatic properties may be obtained.

It is also possible to obtain electrophotographic apparatuses and electrophotographic apparatus process cartridges which the electrophotographic photoconductor of the present invention is used that exhibit good characteristics.

Based on the present invention, coating liquids exhibiting outstanding coating properties and storage stability are obtained, and, by using such coating liquids in fabricating photoconductors, electrophotographic photoconductors may be obtained which provide images of high picture quality without image flaws.

What is claimed is:

1. A coating liquid for an intermediate layer of an electrophotographic photoconductor comprising a solvent, titanium oxide and 0.3 to 10 parts by weight a polycarboxylic acid polymer based on 100 parts by wt of titanium oxide.

2. The coating liquid for an intermediate layer of an electrophotgraphic photoconductor according to claim 1, wherein said polycarboxylic acid polymer is at least one selected from a saturated polycarboxylic acid polymer and an unsaturated polycarboxylic acid polymer.

3. The coating liquid for an intermediate layer of an electrophotgraphic photoconductor according to claim 1, wherein an acid value of said polycarboxylic acid polymer is 100 to 400 mgKOH/g.

4. The coating liquid for an intermediate layer of an electrophotographic photoconductor according to claim 1, wherein said titanium oxide has a purity of 99.0% or higher.

5. The coating liquid for an intermediate layer of an electrophotographic photoconductor according to claim 1, further comprising a resin.

6. The coating liquid for an intermediate layer of an electrophotographic photoconductor according to claim 5, wherein the content of said titanium oxide is 300 to 800 parts by weight in respect to 100 parts by weight of said resin.

7. A method of manufacturing a coating liquid for an intermediate layer of an electrophotographic photoconductor comprising a step for mixing a solvent, a titanium oxide, and at least one of a saturated polycarboxylic acid polymer and an unsaturated polycarboxylic polymer.

* * * * *